United States Patent [19]

Piber

[11] 4,097,704

[45] Jun. 27, 1978

[54] INDUSTRIAL REVERSING SPEED CONTROL TRIGGER SWITCH WITH SNAP-IN MODULES

[75] Inventor: Earl T. Piber, Oconomowoc, Wis.

[73] Assignee: Cutler-Hammer, Inc., Milwaukee, Wis.

[21] Appl. No.: 710,921

[22] Filed: Aug. 2, 1976

[51] Int. Cl.$^2$ .................... H01H 13/08; H02P 7/00

[52] U.S. Cl. .................... 200/157; 200/1 V; 310/50; 318/345 R

[58] Field of Search .................... 361/381, 386, 387; 310/48, 50, 68 R, 68 D; 200/157, 155 R, 1 V; 318/331, 345 R, 345

[56] References Cited

U.S. PATENT DOCUMENTS

| | | | |
|---|---|---|---|
| Re. 26,781 | 2/1970 | Frenzel | 200/157 |
| 3,260,827 | 7/1966 | Frenzel | 200/157 |
| 3,328,613 | 6/1967 | Gawron | 310/48 |
| 3,447,057 | 5/1969 | Brown et al. | 318/345 R |
| 3,456,229 | 7/1969 | Matthews | 338/198 |
| 3,467,801 | 9/1969 | Matthews | 318/345 |
| 3,536,973 | 10/1970 | Matthews et al. | 200/157 |
| 3,543,120 | 11/1970 | Robertson | 318/345 |
| 3,579,002 | 5/1971 | Wickham | 310/50 |
| 3,632,936 | 1/1972 | Piber | 200/157 |
| 3,637,967 | 1/1972 | Braun | 200/155 R |
| 3,648,142 | 3/1972 | Corey et al. | 318/345 R |
| 3,694,699 | 9/1972 | Snyder et al. | 361/387 |
| 3,761,788 | 9/1973 | Matthews et al. | 310/50 |

OTHER PUBLICATIONS

Arrow-Hart, Inc., Trigger Speed Control Switch with Reversing and Trigger Lock, Photo Nos. 7262-1 to 7262-4, and sketch.

*Primary Examiner*—James R. Scott
*Attorney, Agent, or Firm*—Hugh R. Rather; William A. Autio; Michael E. Taken

[57] ABSTRACT

An industrial grade trigger switch having an on-off switch and a resistor controlled speed control circuit both controlled by trigger depression and a reversing switch provided with an operating lever overlying the trigger, and characterized by a large heat sink for the solid state current control elements for continuous service, a large substrate area for the speed control circuit, higher current rating double-pole wiping contacts, relatively simple metal parts, and the capability of being mounted also in consumer grade tools. The switch has modular construction with snap-in coupling of reversing switch and base to the frame.

12 Claims, 11 Drawing Figures

INDUSTRIAL REVERSING SPEED CONTROL TRIGGER SWITCH WITH SNAP-IN MODULES

BACKGROUND OF THE INVENTION

Speed control trigger switches with an attached reversing switch have been known heretofore. For example, C. J. Frenzel Pat. No. 3,260,827, dated July 12, 1966, shows such switch including a reversing operating lever overlying the trigger. While these prior switches have been useful for their intended purpose, this invention relates to improvements thereover.

SUMMARY OF THE INVENTION

An object of the invention is to provide an improved speed control trigger switch especially adapted for industrial applications.

Another object of the invention is to provide a speed control trigger switch with an improved snap-in reversing switch.

A more specific object of the invention is to provide a trigger switch with improved snap-together modular construction.

Another specific object of the invention is to provide a trigger switch with improved double-pole wiping contacts.

Another specific object of the invention is to provide an improved speed control trigger switch having relatively simple metal parts.

Another object of the invention is to provide an improved speed control trigger switch having a relatively large substrate area for its speed control circuit.

Another specific object of the invention is to provide an improved speed control trigger switch having a relatively large heat sink for the solid state power element.

Another specific object of the invention is to provide an improved speed control trigger switch for industrial applications but affording use also in consumer tools.

Other objects and advantages of the invention will hereinafter appear.

DESCRIPTION OF THE PREFERRED EMBODIMENT

Figure 2:
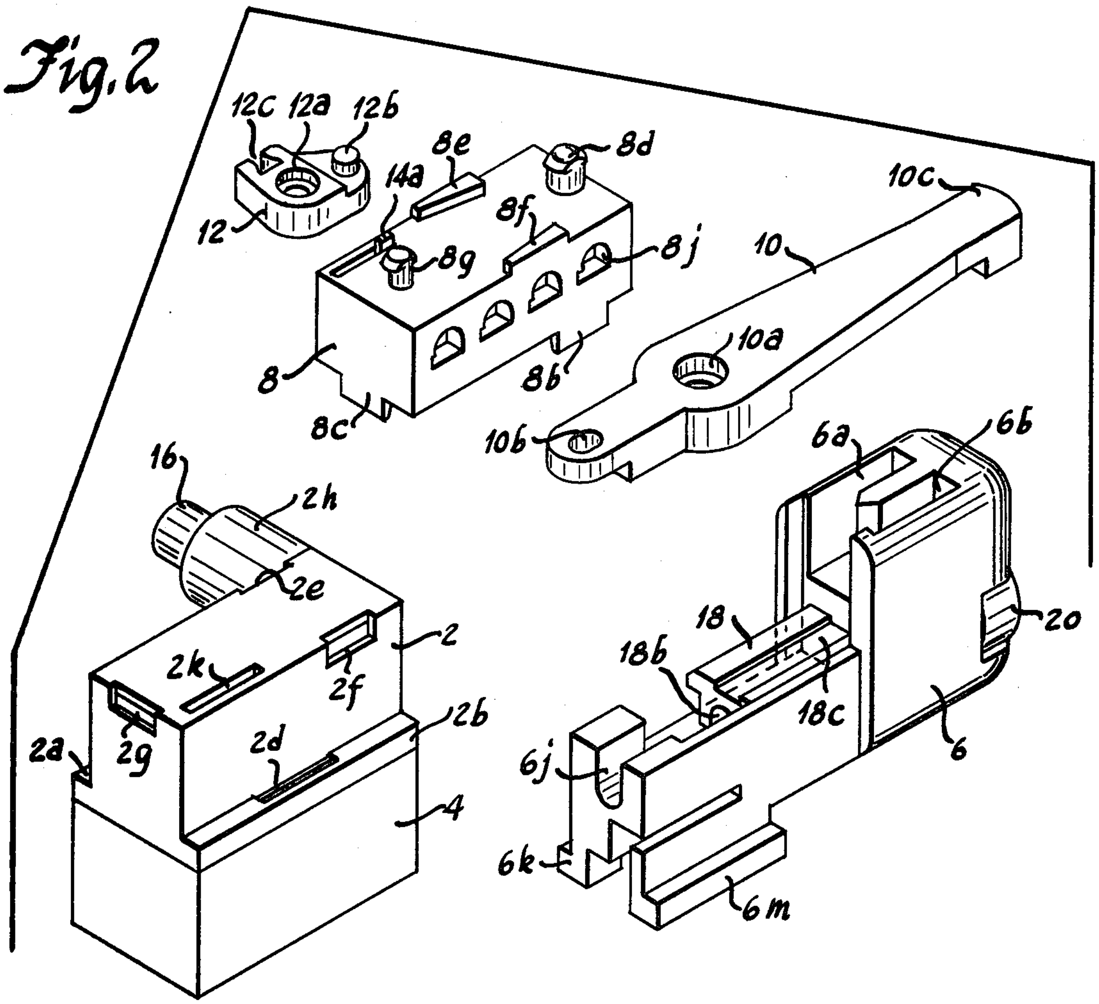
FIG. 2 is an exploded, isometric view of the switch of FIG. 1 showing the reversing switch, the reverse lever, their link, and the trigger removed from the switch housing.
Figure 1:
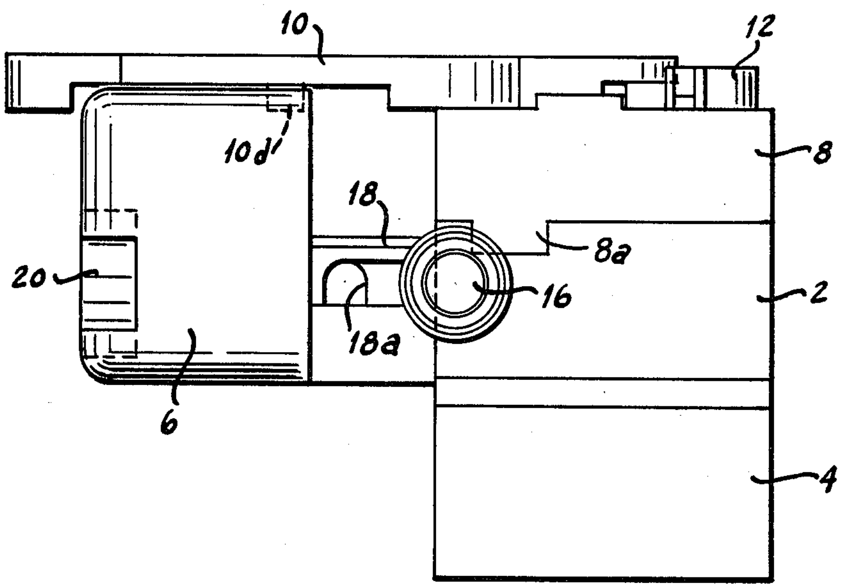
FIG. 1 is an enlarged, left side elevational view of an industrial reversing speed control trigger switch with snap-in modules according to the invention.

Referring to FIGS. 1 and 2, there is shown an industrial speed control trigger switch with snap-in reversing switch according to the invention. This switch comprises an insulating housing including a frame 2 and a snap-in base 4, a trigger 6 slidably mounted in the frame above the base, and a snap-in reversing switch including an insulating switch enclosure 8, a reverse lever 10 and a pivotal link 12 coupling and translating the angular motion of the reverse lever to linear motion for reversing switch actuation.

Figure 11:
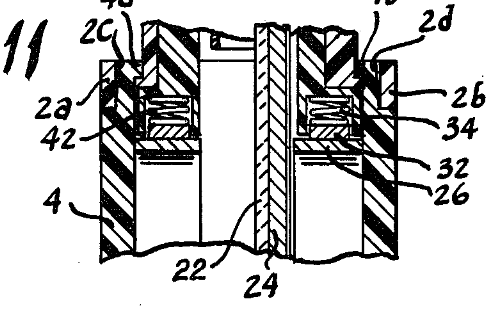
FIG. 11 is a vertical, lateral cross-sectional view taken along line 11—11 of FIG. 4 showing the bridging contactors and their bias springs.

Snap-in means are provided for attaching the lower part of the housing or base 4 to the upper part of the housing or frame 2. This snap-in means comprises lateral flanges **2*a* and 2*b* at the lower left and right sides, respectively, of frame 2 as shown in FIGS. 2 and 11. These flanges are provided at their center with elongated narrow slots 2*c* and 2*d*, respectively, extending up through these flanges, there being a shoulder inwardly of each such slot as shown in FIG. 11. The base is provided with corresponding flat hooks 4*a* and 4*b* that are pushed up through these slots and snap over such shoulders to lock the base to the frame as shown in FIG. 11**.

Snap-in means are also provided for attaching the reversing switch to the top of frame 2. This snap-in means comprises three wide hooks **8*a–c* at the lower edges of the reversing switch enclosure that snap into respective undercut slots 2*e–g* in the upper edges of the frame. As shown in FIGS. 1 and 2, two of these hooks 8*a* and 8*b* are on opposite sides near the forward part of the reversing switch enclosure and the third such hook 8*c* is centrally at the rear end of this enclosure. Also, two of these slots 2*e* and 2*f* are on opposite sides near the forward part of the frame and the third such slot 2*g*** is centrally at the rear end of this frame for matching locations with the three hooks.

The reversing switch is provided with operating means comprising the aforementioned reverse lever 10 and pivotal link 12 shown in FIG. 2. A snap-in, integral stud **8*d* extends up from the forward part of reversing switch enclosure 8 and is provided with a pair of tapered, arcuate teeth that snap through a stepped hole 10*a* in the reverse lever and spread out above the shoulder in this hole to journal the lever on top of the enclosure for limited rotary movement. A pair of integral, spaced apart stops 8*e* and 8*f* in the form of ridges rearwardly of stud 8*d* limit the pivotal movement of the reverse lever therebetween. Another snap-in, integral, upstanding stud 8*g* at the rear portion of the enclosure is provided with a pair of tapered, arcuate teeth that snap through a stepped hole 12*a* in link 12 and spread out above the shoulder in this hole to journal the link on top of the enclosure. This link is provided with an overcut portion having an integrally molded upstanding cylindrical stud 12*b* that extends into an oblong hole 10*b*** in the undercut rear end portion of the reverse lever to allow mounting of the reverse lever and link substantially in the same plane as shown in FIG. 1. Thus, as the forward end 10c of the reverse lever is swung to the left or right, link 12 is rotated in opposite directions on its pivot stud and a lateral slot 12c therein engages a projection 14a of a printed circuit (PC) board 14 and slides it forward or back to the rear to actuate the reversing switch as hereinafter described in connection with FIG. 9.

Frame 2 is provided with a spring-biased lock button 16 as shown in FIGS. 1 and 2. This button is retained in a sleeve 2h integrally molded on the frame so as to extend left from the forward part thereof. A spring (not shown) biases this lock button outwardly and the inner end of a shaft attached to the lock button engages in a slot 18a of an adjustable stop block 18 mounted in the trigger. An adjusting screw 20 extends from the forward end through the trigger for setting this stop block in a desired forward-rearward position to set the desired speed as hereinafter described. The trigger is provided with a pair of forwardly-extending slots 6a and 6b shown in FIG. 2, one of which embraces a downward projection 10d on the reverse lever shown in FIG. 3 in each position of the reverse lever when the trigger is depressed. This constitutes an interlock to prevent actuation of the reversing switch when the trigger is depressed.

Figure 3:
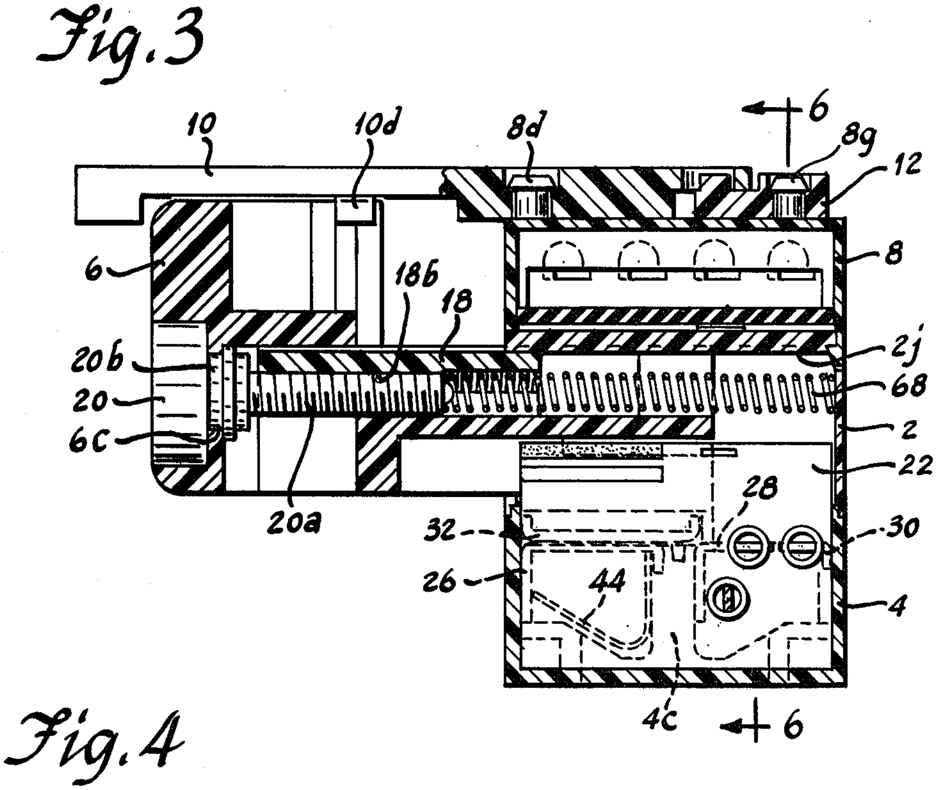
FIG. 3 is a vertical, longitudinal cross-sectional view showing the internal parts of the switch substantially along center line 3—3 of FIG. 6.
Figure 6:
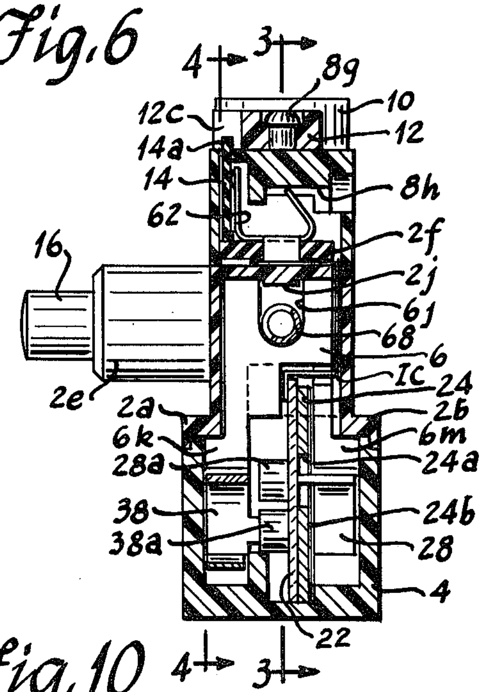
FIG. 6 is a vertical, lateral cross-sectional view along line 6—6 of the switch of FIG. 3 showing both the on-off switch and the reversing switch.

Insulating, molded frame 2 is provided with a longitudinal rib 2j extending throughout the length of its internal upper surface as shown in FIGS. 3 and 6 that fits into a groove 6j (FIG. 2) on the trigger and into groove 18c (FIGS. 2, 4, and 6) of the stop block to guide both the trigger and the stop block in forward-rearward movement. This trigger is also confined for guidance in the frame by its lateral flanges 6k and 6m that slide in the complementary spaces under flanges 2a and 2b of the frame as shown in FIG. 6, forward movement of the trigger being limited by flanges 6k and 6m thereof abutting the forward inner wall of the base as shown in FIG. 4.

Base 4 houses a double-pole on-off switch. As shown in FIGS. 3–6, the interior of the base is divided left and right by a subassembly including a PC substrate 22 and a heat sink 24, and is divided forward-rearward by integrally-molded dividing walls 4c and 4d within the base, as shown most clearly in FIGS. 4 and 5, to provide four compartments.

Figure 4:
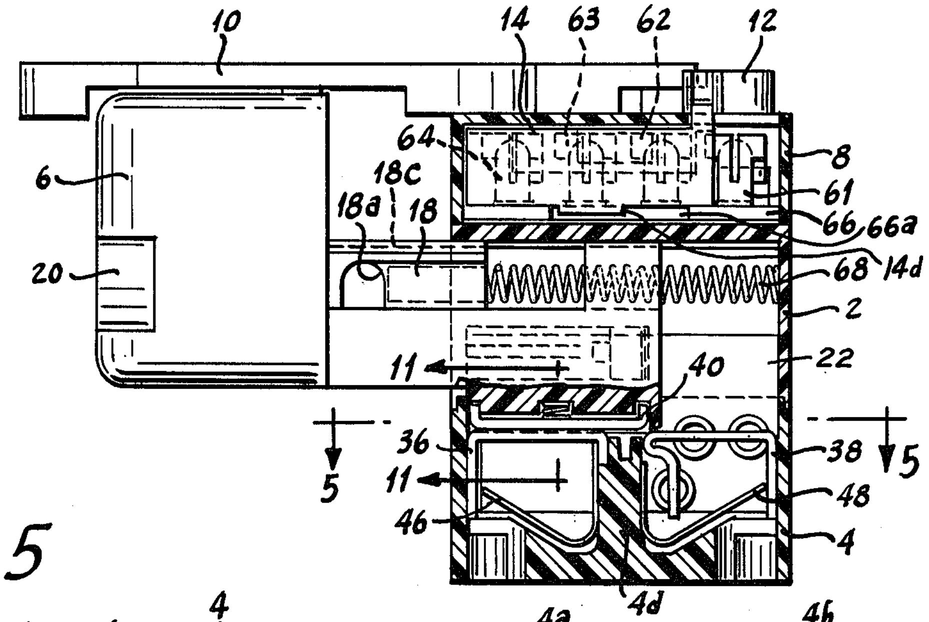
FIG. 4 is a vertical longitudinal cross-sectional view showing the internal parts of the switch through the left side substantially along line 4—4 of FIG. 6.
Figure 5:
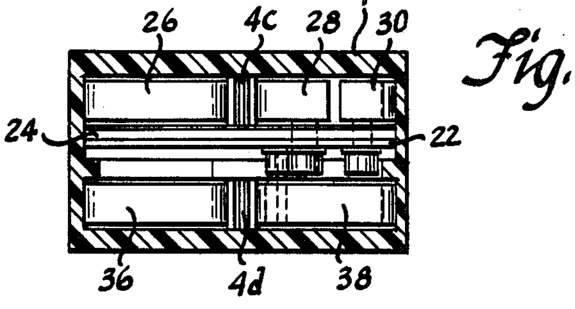
FIG. 5 is a horizontal cross-sectional view through the base substantially along line 5—5 of FIG. 4 showing a top view of the double-pole stationary contacts.
Figure 7:
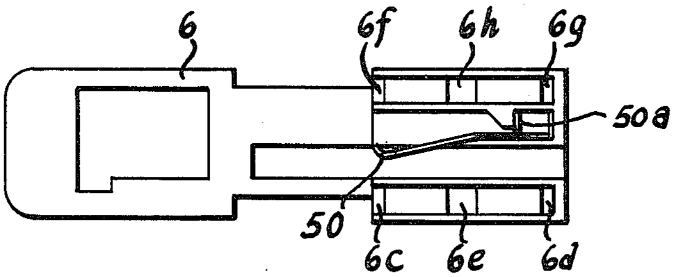
FIG. 7 is a bottom view of the trigger showing the movable wiper for the variable resistor and the slots for the movable bridging contacts.

The left pole of this on-off switch is shown in FIG. 4 and the right pole thereof is shown in dotted lines in FIG. 3. As shown in FIG. 3, the right pole includes a stationary contact 26 in the forward right compartment, stationary contacts 28 and 30 spaced apart in the rear right compartment, and a slidable bridging contactor 32 arranged for bridging these stationary contacts when the trigger is depressed. The bottom of the trigger is provided with a pair of recesses 6c and 6d for retaining the upturned ends of contactor 32 and a center recess 6e therebetween for retaining a helical compression spring 34 that biases the contactor down onto the stationary contacts as shown in FIGS. 3, 7 and 11. The left pole includes a stationary contact 36 in the forward left compartment, a stationary contact 38 in the rear left compartment, and a slidable contactor 40 for bridging these stationary contacts when the trigger is depressed as shown in FIG. 4. The bottom of the trigger, shown in FIG. 7, is provided with a pair of recesses 6f and 6g for retaining the upturned ends of contactor 40 and a center recess 6h therebetween for retaining a helical compression spring 42 that biases the contactor down onto the stationary contacts as shown in FIGS. 4 and 11. These two poles of the on-off switch are also shown diagrammatically in the circuit diagram in FIG. 10.

Figure 10:
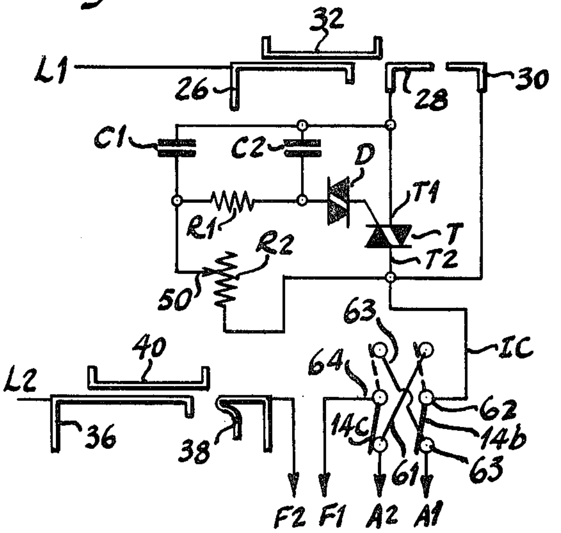
FIG. 10 is a schematic circuit diagram of the speed control system carried by the substrate of FIG. 8.

These two poles of the on-off switch are also provided with suitable press-in lead connectors for making the connections, shown in FIG. 10. For this purpose, stationary contact 26 is provided with a spring clip 44 held in a slot in the forward right compartment of the base and having a deflectible end pressing against the shank of stationary contact 26 so that the bare, soldered end of a stranded wire can be inserted through a hole in the bottom of the base and pressed-in and gripped therebetween for electrical connection and retention therein thereby to connect power line L1 to the right pole of the on-off switch as shown in FIG. 10. In a similar manner, stationary contact 36 is provided with a similar spring clip 46 shown in FIG. 4 for connecting power line L2 to the left pole of the on-off switch. And likewise, stationary contact 38 is provided with a spring clip 48 as shown in FIG. 4 for connecting a wire from side F2 of the motor field winding thereto as shown in FIG. 10.

As shown in FIGS. 3 and 4, stationary contacts 26 and 36 are mounted in suitable recesses in the base.

Figure 8:
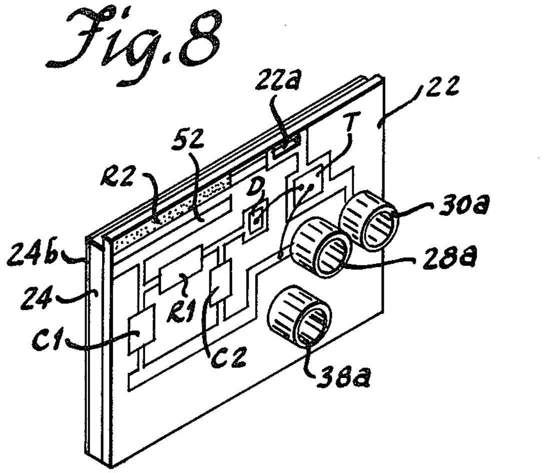
FIG. 8 is an isometric view of the printed circuit (PC) substrate and heat sink assembly.

Means are provided on substrate 22 for mounting and electrically connecting stationary contacts 28, 30 and 38 in the circuit. For this purpose, tubular terminal-supports 28a, 30a and 38a, FIG. 8, are rigidly secured to the substrate as by slightly reduced sections frictionally fitting into holes therein. Lateral projections extend from stationary contacts 28 and 30 into terminals 28a and 30a to frictionally and rigidly support the same, respectively, therein. The heat sink is provided with a suitable slot 24a adjacent terminals 28a, 30a and 38a to avoid short circuit thereby as shown in FIG. 6. A lateral projection also extends from stationary contact 38 into terminal 38a as shown in FIG. 6 to support the same therein. Heat sink 24 is provided with a suitable insulating film 24b on its right surface to prevent shorting the stationary contacts thereto as shown in FIG. 6 and 8.

The speed control circuit is formed as a printed circuit on substrate 22 as shown in FIG. 8. This substrate is made of a good heat conducting and electrically insulating material such as alumina so to conduct heat from Triac T to copper heat sink 24. This printed circuit strip connects one side of capacitors C1 and C2 to terminal 28a and thus to contact 28 as shown in FIG. 8 and 10. A wire connects this printed circuit strip to terminal T1 of the Triac. The other side of capacitor C1 is connected by a PC strip to one side of resistor R1 and to wiper 50 of variable resistor R2, this wiper being shown in FIG. 7. As shown therein, this wiper is provided with a pair of spaced lateral projections 50a that extend into a slot in the trigger to mount the wiper in the trigger so that its other wiping end portion is biased to the right against the substrate to bridge PC conductor strip 52 and resistor R2. This wiping end portion is preferably bifurcated to provide a pair of fingers for good electrical contact with PC conductor strip 50 and resistor R2.

On the aforesaid PC substrate, the other side of capacitor C2 is connected to the other side of resistor R1 and also to bidirectional thyristor diode D. A wire connects diode D to the gate terminal of the Triac. Terminal T2 of the Triac is connected by a PC strip to shunting contact 30 through terminal 30a and also to resistor R2 and internal connector IC, the latter being connected to the second contact-terminal 62 of contact-terminals 61–64 of the reversing switch as hereinafter described with reference to FIGS. 6 and 8–10.

Figure 9:
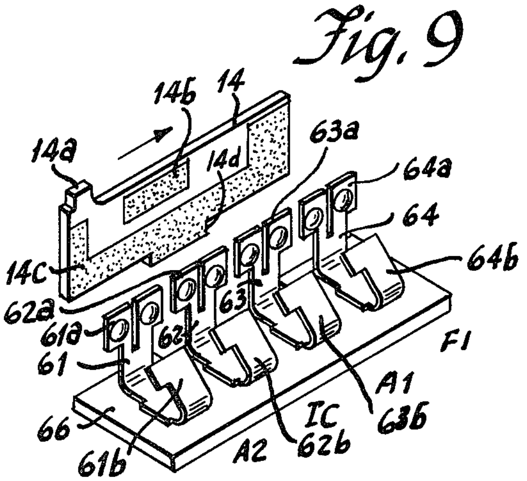
FIG. 9 is an exploded isometric view of parts of the reversing switch including the slidable PC board and the mounting board with the contact clips mounted on the latter.

This reversing switch as shown in FIGS. 6 and 9 is provided with four contact-terminals 61–64 mounted on an insulating mounting board 66 made of phenolic or the like that is mounted within the bottom of enclosure 8. Each contact terminal may be rigidly attached to the mounting board by a pair of tabs extending through a corresponding pair of narrow slots in the board and the tabs bite into the edges of the slots or are bent over on the other side. The contacting portions 61*a*–64*a* of these contact-terminals are bifurcated to insure good electrical contact with PC bridging members 14*b* and 14*c* on PC board 14 slidable between them and the left wall of enclosure 8. The terminal portions 61*b*–64*b* of these contacts terminals are angular portions that spring back and bite into the bare soldered ends of press-in conductors inserted between them and the adjacent wall 8*h* of the enclosure shown in FIG. 6. A lug 14*d*, FIG. 9, on the lower edge of PC board 14 traverses a slot 66*a*, FIG. 4, in the left edge of mounting board 66 to limit the forward and rearward movements of the reversing switch PC board. As shown in FIGS. 2 and 6, there are four holes 8*j* in the right wall of this reversing switch enclosure through which press-in leads may be inserted to contact with the terminal portions 61*b*–64*b*. As shown in FIGS. 6 and 8–10, internal connector IC of brass or the like connects contact-terminal 62 to the PC substrate. For this purpose, one end of this connector IC is clamped between the mounting tabs of contact-terminal 62 and the top of frame 2 as shown in FIG. 6 and it extends down through a slot 2*k* in the top of the frame, shown in FIGS. 2 and 6, and then down along the right side of the trigger. Its lower end is bent to the left and hooked into a slot 22*a*, shown in FIG. 8, and electrically connected to the printed circuit strip of the substrate at this slot. This affords the IC connection shown in FIG. 10.

The reversing switch operates in the following manner. When forward end 10*c* of the reverse lever is moved to its leftward position, link 12 rotates clockwise (FIG. 2) and slides PC board 14 forward, in the direction of the arrow in FIG. 9, thus causing contactor 14*b* to bridge contacts 62 and 63 and causing contactor 14*c* to bridge contacts 61 and 64. In FIGS. 9 and 10, the motor armature winding of a universal motor or the like is connected across terminals A1 (63) and A2 (61) whereas the motor field winding is connected across terminals F1 (64) and F2 (38), the latter contact being shown also in FIG. 4. Thus, with the aforesaid operation, the reversing switch will be in the solid line position shown in FIG. 10. This presets the motor for running in the forward direction with current flowing to the left in FIG. 10 through both the armature and field.

On the other hand, when the reverse lever is moved to the right, link 12 rotates counter-clockwise and slides PC board 14 rearward, thus causing contactor 14*b* to bridge contacts 61 and 62 and causing contactor 14*c* to bridge contacts 63 and 64. The reversing switch will now be in the dotted line position shown in FIG. 10. This presets the motor for running in the reverse direction with current flowing to the right in the armature and to the left in the field as viewed in FIG. 10. This reversal of the current in the armature only reverses the motor direction of rotation when the trigger is depressed to close the on-off contacts.

This trigger switch is of the momentary type in that the trigger is normally biased into its forward, off position by a helical compression spring 68 as shown in FIG. 3. The rear end of this spring bears against the rear wall of frame 2 whereas the forward end thereof bears against the rear end of threaded shaft 20*a* which is an integral part of speed adjusting screw 20. As shown in FIG. 3, this speed adjusting screw has means preventing longitudinal movement in the trigger while permitting rotary movement thereof. This means comprises an annular groove 20*b* directly behind the external knob and a suitable resilient constriction 6*c* within the hole in the trigger which will snap into the annular groove when the adjusting screw is pressed into its hole. The rear end of this screw is provided with a boss projecting within the end of the spring to retain the latter thereon. Thus, whenever the trigger is released after being depressed, this spring will restore it to its off position.

Stop block 18 shown in FIGS. 2–4 may be preset for a desired motor speed. Thus, rotation of screw 20 causes the stop block to move. For this purpose, the stop block is provided with a channel 18*b* along its bottom having half-circle threads that rest in mesh with the threads of shaft 20*a* to allow the shaft when rotated by its forward knob to drive the stop block rearwardly or forwardly to position locking slot 18*a* with respect to the lock pin of button 16. Once the lock pin is engaged in the slot, rotation of the screw affords vernier adjustment of the trigger position and thus the motor speed. A slight depression of the trigger allows the spring-biased lock pin to disengage whereafter the return spring restores the trigger to off position when released.

When the trigger is depressed, the circuit in FIG. 10 first turns the motor on and then increases the speed. For this purpose, initial depression of the trigger causes movable contactors 32 and 40 to bridge contacts 26–28 and 36–38 of the doublepole on-off switch thereby to apply power through lines L1 and L2 to the motor. Thus, current flows from line L1 through contact 26, contactor 32, contact 28, capacitor C1 and in parallel therewith through capacitor C2 and resistor R1, and then through variable resistor R2, reversing switch contactor 14*b*, the armature winding of the motor, reversing switch contactor 14*c*, the field winding of the motor, contact 38, contactor 40 and contact 36 to line L2. This causes capacitor C1 and C2 to charge and when they have charged to the triggering level of diode D, this diode suddenly passes a pulse of current through the gate and terminal T1 junction to fire the Triac into conduction for the remainder of the A.C. half-cycle. On each alternate half-cycle the current flows in the opposite direction to fire the Triac into conduction for full-wave control of the motor.

As the trigger is depressed further, the speed of the motor is increased. This depression of the trigger moves wiper 50 of variable resistor R2 to reduce the resistance in the circuit. This causes increase in the charging current to the capacitors so that they charged to the break-over level of the Diac sooner, thus increasing the energy applied to the motor causing an increase in motor speed. The speed adjusting screw may be adjusted to any desired motor speed and left there so that the operator can depress the trigger to this same speed thereafter and lock the trigger thereat.

Full depression of the trigger shunts the Triac for maximum motor speed by putting the motor across the power line. Thus, full trigger depression causes contactor 32 to bridge contacts 26 and 30 to shunt the speed control circuit. Then full line A.C. is applied to the motor for full speed operation.

To reverse motor operation, the trigger is released and the reversing switch lever is shifted. This moves bridging contactors 14b and 14c to the dotted line position shown in FIG. 10. When the trigger is now depressed, the current will be reversed in the armature with respect to the field to reverse motor rotation. Speed control functions as before by further depression of the trigger.

While the apparatus hereinbefore described is effectively adapted to fulfill the objects stated, it is to be understood that the invention is not intended to be limited to the particular preferred embodiment of industrial reversing speed control trigger switch with snap-in modules disclosed, inasmuch as it is susceptible of various modifications without departing from the scope of the appended claims.

I claim:

1. An industrial reversing speed control trigger switch comprising:

a frame having a trigger aperture therein;

an insulating base having a compartment therein;

means coupling said base to said frame;

a spring-biased trigger slidably mounted between said base and frame and extending out through said aperture for depression by the forefinger of the user;

a heat sink and substrate assembly in said base compartment mounting a speed control circuit;

a double-pole on-off switch connected to said speed control circuit comprising two pairs of stationary contacts with a first contact of each said pair mounted in said base and a second contact of each said pair mounted on said substrate and a pair of spring-biased movable contacts carried by said trigger for bridging the stationary contacts of the respective pairs thereof when said trigger is depressed;

a reversing switch comprising an enclosure and reversing switch contacts housed therein and an operating lever;

means coupling said reversing switch enclosure to said frame;

means in said base for making connections between said on-off switch stationary contacts and an external circuit;

means in said enclosure for making connections between said reversing switch contacts and an external circuit;

and means extending from said substrate to said enclosure for connecting said speed control circuit to said reversing switch.

2. The switch defined in claim 1, wherein:

said substrate is mounted vertically with respect to said base;

and said speed control circuit comprises:

a printed circuit on said substrate;

speed control components mounted on said substrate and connected to said printed circuit;

said speed control components comprising a resistor strip;

and a wiper coupled to said trigger to vary the resistance of said resistor strip when said trigger is actuated.

3. The switch defined in claim 2, wherein:

said speed control circuit also comprises terminals mounted on said substrate and connected to said printed circuit;

and said second contacts of said pairs of stationary contacts are mounted on said terminals and said first contacts thereof are mounted in compartments in said base.

4. The switch defined in claim 3, wherein:

said double-pole on-off switch comprises a shunting contact mounted on one surface of said substrate and connected to bypass said speed control circuit when engaged by the corresponding movable bridging contact.

5. The switch defined in claim 1, wherein:

the contacts of each of said two pairs of stationary contacts are in alignment parallel to the direction of movement of said trigger;

and said movable contacts are arranged for sliding movement, each moving along a first contact of the associated pair of stationary contacts into engagement with the second contact thereof.

6. The switch defined in claim 1, wherein:

said substrate is a planar member mounted vertically within said base to divide the compartment therein into two parts;

and said second contacts are mounted on the opposite surfaces of said substrate so as to be housed within said two parts of said compartment, respectively.

7. The switch defined in claim 6, wherein:

said heat sink is a planar member contiguous to one surface of said substrate with a clearance slot therein for the corresponding stationary contact.

8. The switch defined in claim 1, wherein said reversing switch contacts comprise:

four stationary contacts secured in spaced apart relation on an insulating mounting board, said board being mounted within said enclosure;

and a PC board having a pair of contactors thereon, said PC board being slidably confined between said stationary contacts and a wall of said enclosure for bridging selected pairs of said stationary contacts upon actuation of said operating lever.

9. A reversing speed control trigger switch of modular construction comprising:

an insulating housing including an upper module having a trigger aperture at the foreward end thereof, and a lower module having a vertically positioned substrate carrying a speed control circuit, said substrate dividing the interior of said lower module into two compartments and extending partially up into said upper module, and double-pole on-off switch contacts mounted in the respective compartments;

snap-in means coupling said lower module to said upper module;

a trigger slidably mounted in said upper module directly above said lower module and extending out through said aperture, said trigger having a channel overlying the upper portion of said substrate including means therein for operating said speed control circuit, and said trigger having means for operating said on-off switch contacts;

a spring biasing said trigger forwardly;

a reversing switch module on top of said upper module and having reversing contacts and an operating lever extending forwardly above said trigger;

snap-in means coupling said reversing switch module to said upper module;

means for connecting an external circuit to said double-pole on-off switch contacts in said lower module;

means for connecting an external circuit to said reversing contacts in said reversing switch module;

and means connecting said speed control circuit to a contact of said reversing switch.

10. The switch defined in claim 9, wherein:

said substrate includes a flat heat sink secured to the back surface thereof;

and a thin insulating member covering the exposed surface of said heat sink to prevent contact by the corresponding pole of on-off switch contacts.

11. The switch defined in claim 9, wherein:

said means for operating said on-off switch contacts comprise recesses in the bottom of said trigger for retaining a pair of spring-biased bridging contacts for sliding movement therewith when said trigger is depressed.

12. The switch defined in claim 9, wherein:

said speed control circuit comprises a resistor strip and a conductor strip in spaced apart parallel relation on the upper side surface of said substrate;

and said means for operating said speed control circuit comprises a resilient wiper and means mounting said wiper in said channel of said trigger for movement therewith to slidingly contact said resistor strip and said conductor strip thereby to vary the amount of resistance in said speed control circuit.

* * * * *